_United States Patent_ [19]

Yoshida et al.

[11] 4,257,839

[45] Mar. 24, 1981

[54] APPARATUS FOR JOINING OPPOSED LEG PORTIONS OF MOLDED COUPLING ELEMENTS FOR SLIDE FASTENERS

[75] Inventors: Hiroshi Yoshida; Shunji Akashi, both of Kurobe, Japan

[73] Assignee: Yoshida Kogyo, K.K., Tokyo, Japan

[21] Appl. No.: 47,720

[22] Filed: Jun. 12, 1979

[30] Foreign Application Priority Data

Jun. 20, 1978 [JP] Japan .................................. 53-74659

[51] Int. Cl.³ ............................................. B29D 5/00
[52] U.S. Cl. ...................................... 156/555; 156/66; 156/463; 156/499; 156/580.2; 425/545; 425/814
[58] Field of Search ...................... 156/66, 73.1, 580.1, 156/580.2, 461, 463, 499, 555; 425/545, 814

[56] References Cited

U.S. PATENT DOCUMENTS

| | | | |
|---|---|---|---|
| 3,376,179 | 4/1968 | Balamuth | 156/580.2 |
| 3,713,923 | 1/1973 | Laguerre | 156/66 |
| 3,953,272 | 4/1976 | Webber | 156/461 |
| 3,962,007 | 6/1976 | Heimberger | 156/66 |
| 4,025,277 | 5/1977 | Monroe | 425/814 |
| 4,026,756 | 5/1977 | Stanfield et al. | 156/555 |
| 4,033,014 | 7/1977 | Manning | 24/205.16 R |

Primary Examiner—Michael G. Wityshyn
Attorney, Agent, or Firm—Robert E. Burns; Emmanuel J. Lobato; Bruce L. Adams

[57] ABSTRACT

A method of welding a row of interconnected thermoplastic coupling elements for slide fasteners at opposed leg portions of each coupling element with the use of an ultrasonic horn. The method comprises: pressing the opposed leg portions of the coupling elements against the ultrasonic horn on its opposite sides during the coupling elements are being fed at constant speed; concurrently with this pressing step, fusing the opposed leg portions of the coupling elements at their confronting inner surfaces by ultrasonically vibrating the ultrasonic horn in a direction parallel to the confronting inner surfaces; and pressing the opposed leg portions of the coupling elements, after the latter is disengaged from the ultrasonic horn, against each other so as to be united at the confronting inner surfaces that have been fused. An apparatus for carrying the above method into practice efficiently and accurately is also disclosed.

5 Claims, 8 Drawing Figures

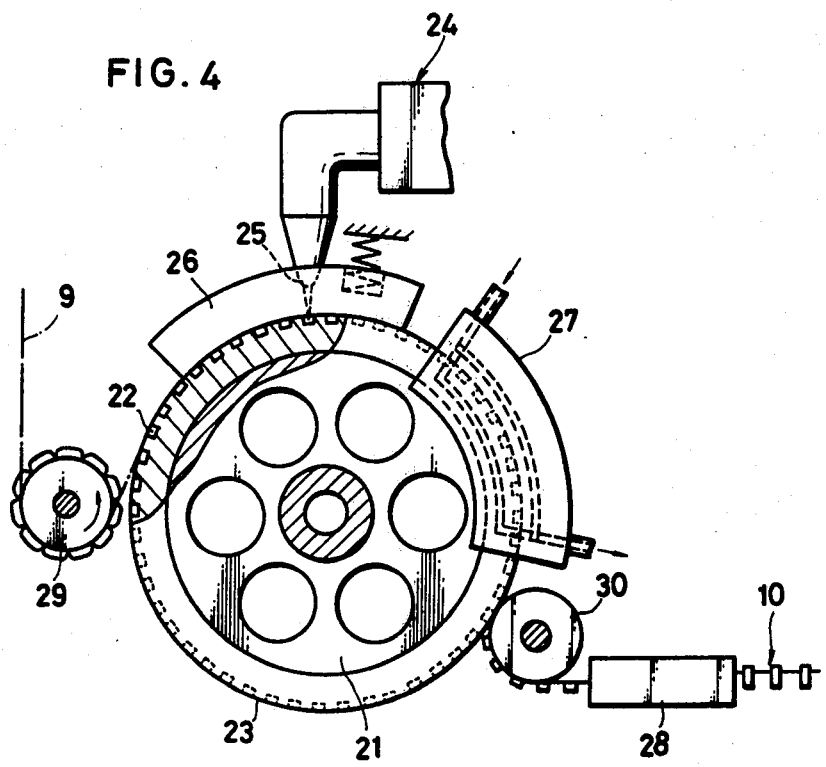

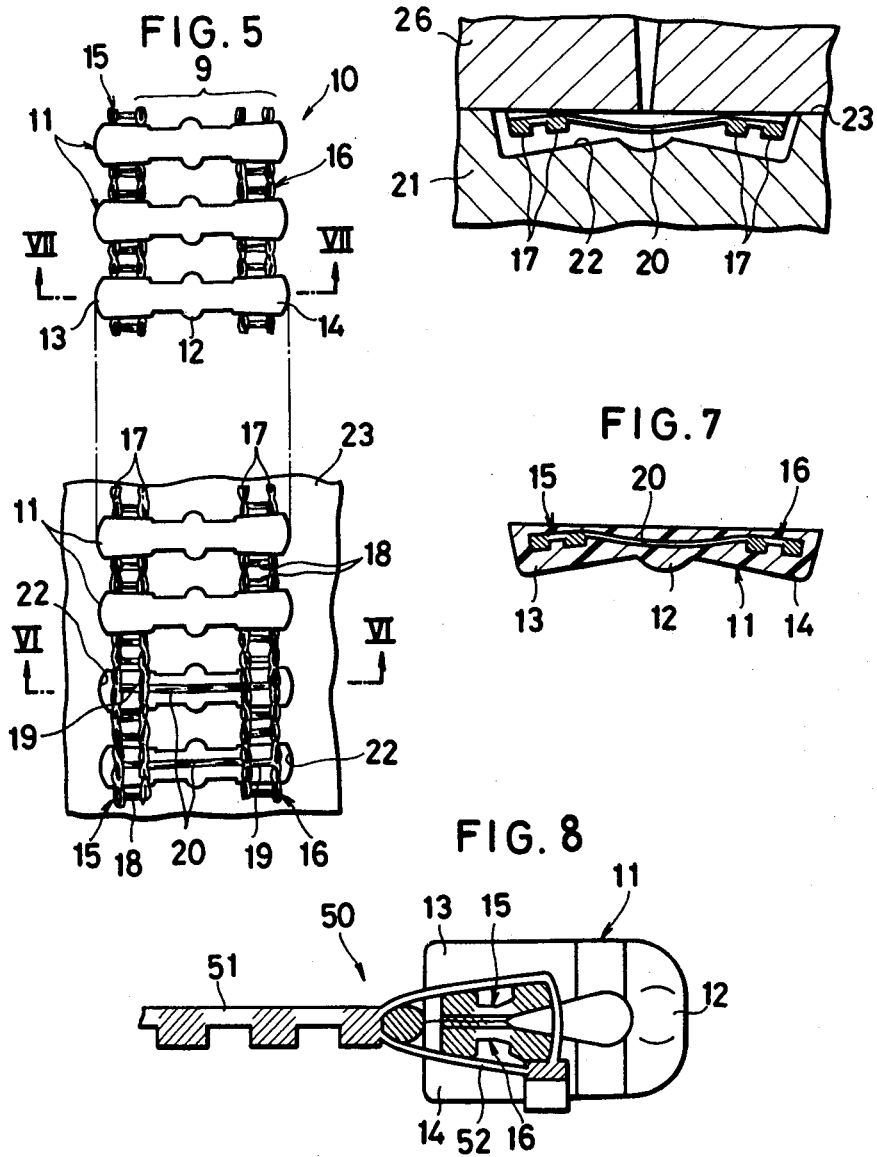

APPARATUS FOR JOINING OPPOSED LEG PORTIONS OF MOLDED COUPLING ELEMENTS FOR SLIDE FASTENERS

BACKGROUND OF THE INVENTION

1. Field of the Invention

This invention relates generally to the production of a coupling element assembly for slide fasteners, and more particularly to a method of and apparatus for welding opposed leg portions of individual coupling elements of such assembly.

2. Prior Art

Various attempts have been made to join together opposite leg portions of each of a row of molded coupling elements to provide a complete coupling assembly for slide fasteners. To this end, it is known to fuse the coupling element leg portions by ultrasonic vibrations applied in a direction perpendicular to the plane of their confronting surfaces. This necessitates a discontinuation of travel of the whole coupling element assembly at each cycle of fusing operation, which would literally retard the rate of production.

SUMMARY OF THE INVENTION

It is therfore an object of this invention to provide a method of joining opposed leg portions of molded coupling elements for slide fasteners at a maximum rate of yield and accuracy.

Another object of the invention is to provide a method of welding opposed leg portions of molded coupling elements for slide fasteners, which method ensures joining of the coupling element leg portions with a minimum of surface deformation or defects.

Still another object of the invention is to provide an improved apparatus which can carry the above methods into practice efficiently and accurately.

According to the method of this invention, the opposed leg portions of the coupling elements for slide fasteners are pressed against an ultrasonic horn on its opposite sides while the coupling elements are being fed at constant speed. Concurrently with this, the opposed leg portions of the coupling elements are softened at their confronting inner surfaces by ultrasonically vibrating the ultrasonic horn in a direction parallel to the confronting inner surfaces. After being disengaged from the ultrasonic horn, the opposed leg portions of the coupling elements are pressed against each other so as to be united together at the confronting inner surfaces that have been softened.

According to a preferred form of apparatus of the invention, there is provided a shaping die member which has an elongated channel for the passage therethrough of the coupling elements. The channel varies in width to provide a pair of first and second press stations, the second station being located down-stream of the first press station. An ultrasonic horn is disposed in the first press station for softening the opposed leg portions of each coupling element. The channel has at the first press station a width slightly smaller than the sum of the thickness of the opposed leg portions of one of the coupling elements and the thickness of the ultrasonic horn, whereby the opposed leg portions of the coupling elements can be pressed against the ultrasonic horn on its opposite sides. The channel has at the second press station a substantially uniform width slightly smaller than the total thickness of the opposed leg portions of one of the coupling elements, whereby the opposed leg portions of individual coupling elements can be pressed against each other so as to be united together at their confronting inner surfaces that have been softened.

Many other advantages and features of the present invention will become manifest to those versed in the art upon making reference to the detailed description and the accompanying sheets of drawings in which preferred structural embodiments incorporating the principles of the present invention are shown by way of example.

BRIEF DESCRIPTION OF THE DRAWINGS

FIG. 4 is a schematic view illustrating the manner in which a coupling element assembly for slide fasteners is preformed;

FIG. 5 is a fragmentary, enlarged plan view of the coupling element assembly of FIG. 4, with the periphery of a molding wheel fragmentarily shown;

FIG. 6 is an enlarged cross-sectional view taken along line VI—VI of FIG. 5;

FIG. 7 is an enlarged cross-sectional view taken along line VII—VII of FIG. 5; and FIG. 8 is a fragmentary cross-sectional view of a slide fastener stringer which is manufactured with use of the coupling element assembly processed in accordance with the invention.

DETAILED DESCRIPTION

Figure 1:
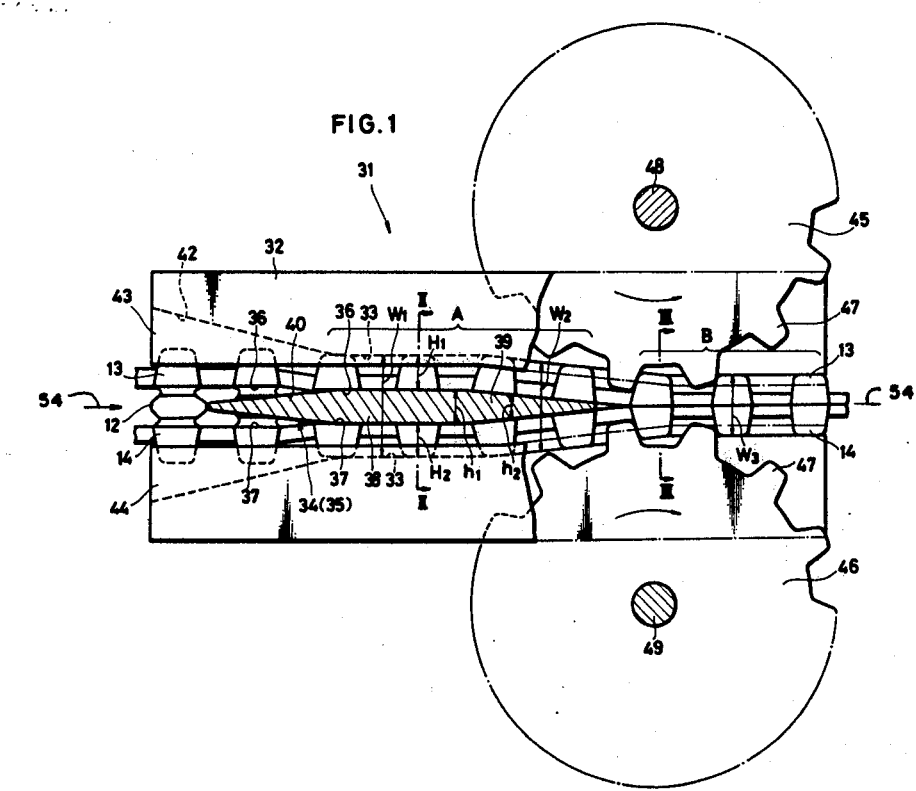
FIG. 1 is a side elevational view, with parts broken away, of the welding apparatus embodying this invention.

FIG. 5 shows a coupling element assembly for slide fasteners generally designated at 10, as it is spread flat before being bent into a U shape. The coupling assembly includes a row of laterally spaced coupling elements 11 made of a thermoplastic material, and a warp-knit elongate, ladder-like structure 9. Each coupling element 11 has a head portion 12 and a pair of leg portions 13,14 extending in opposite directions from the head portion 12. The warp-knit elongate structure 9 includes a pair of elongate warp-knit webs 15,16 extending transversely of the coupling elements 11 and embedded in the leg portions 13 and 14 respectively of each coupling element 11 to interconnect adjacent ones of the coupling elements 11. Each of the warp-knit webs 15,16 comprises a pair of first threads 17,17 each forming a wale and a second thread 18 interlaced or interknitted with the first threads 17,17. At least one third thread 19 is interlaced and interknitted with two pairs of first threads 17,17 and has portions 20 spaced at regular intervals longitudinally of the first threads 17,17 and embedded longitudinally in the coupling elements 11.

As shown in FIG. 4, the warp-knit elongate structure 9 is wound on a molding wheel 21 with the portions 20 of the third thread 19 disposed in a plurality of mold cavities 22 formed at regular spaced intervals in and along the periphery 23 of the molding wheel 21. As the molding wheel 21 rotates, the warp-knit elongate structure 9 is fed past an extrusion machine 24 which discharges from its nozzle 25 a predetermined amount of thermoplastic material in molten or semi-molten state which is delivered to the mold cavities 22. A closure shoe 26 coacts with the profile of the molding wheel 21 to hold the thermoplastic material in the mold cavities 22. Subsequently, the thermoplastic material in the mold cavities 22 is cooled to solid by a cooling machine 27. The resultant coupling element assembly 10 is generally of a ladder-like structure, as shown in FIG. 5. After it is removed from the molding wheel 21, the coupling element assembly 10 is folded on itself by a bending machine 28 along its longitudinal center line so as to present a substantially U-shaped end elevation, the individual coupling elements 11 being bent into the shape shown in FIG. 2. Designated at 29 in FIG. 4 is a quide roller for the elongate warp-knit, ladder-like structure 9 and at 30 is a coupling element assembly removal roller.

Figure 2:
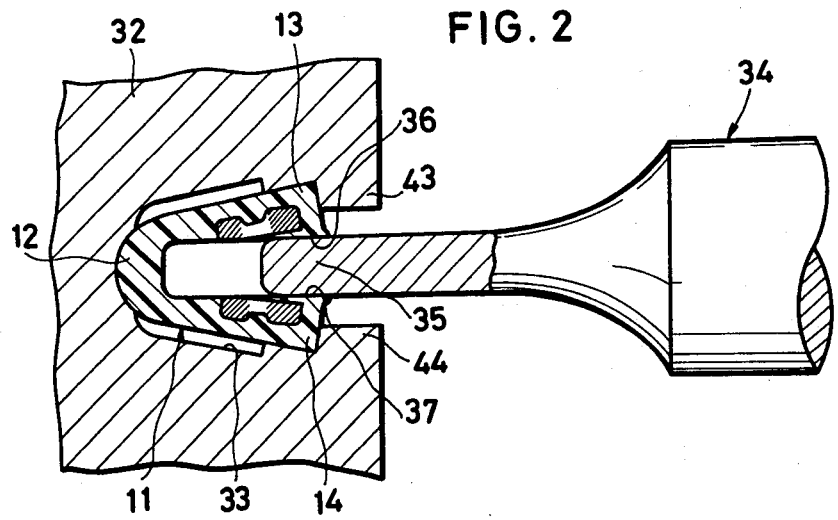
FIG. 2 is a cross-sectional view taken along line II—II of FIG. 1.
Figure 3:
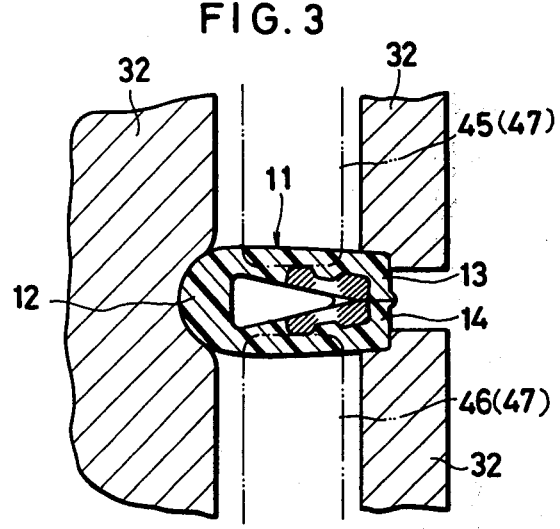
FIG. 3 is a cross-sectional view taken along line III—III of FIG. 1.

FIGS. 1 through 3 show a welding apparatus 31 embodying the invention. The apparatus 31 essentially comprises a shaping die member 32 having an elongated channel 33 provided for the passage of the coupling element assembly 10, and an ultrasonic horn 34 having its tip end 35 (FIG. 2) projecting into the channel 33 for softening the leg portions 13,14 of the individual coupling element 11 at their confronting inner surfaces 36,37.

As best shown in FIG. 1, the tip end 35 of the ultrasonic horn 34 is in the form of a vane having a central portion 38 of uniform thickness, and a pair of first and second wedge-like portions 39,40.

The channel 33 in the shaping die member 32 varies in width to provide a first press station A where the coupling element leg portions 13,14 are fused at their confronting inner surfaces 36,37 by the ultrasonic horn 34, and a second press station B where the opposed leg portions 13,14 are pressed against each other and united together at the confronting inner surfaces 36,37 that have been fused. The channel 33 has a mouth 42 flaring toward its inlet end to facilitate introduction of the coupling element assembly 10 into the first press station A. The channel 33 is further provided along its upper and lower edges with a pair of flanges 43,44 respectively to prevent the coupling element assembly 10 from transverse displacement in the channel 33. It is preferably to coat the wall surfaces of the channel 33 with "Teflon" (Trademark for polytetrafluoethylene) or other suitable coating material to provide for smooth movement therealong of the coupling element assembly 10.

The ultrasonic horn 34 projects into the channel 33 by the tip end 35 such that the central portion 38 and the first wedge-like portion 39 are positioned in the first press station A, the first wedge-like portion 39 tapering toward and terminating immediately short of the second press station B. The second wedge-like portion 40 extends from the central portion 38 into the channel mouth 42.

The first press station A is subdivided into a first half section where the channel 33 has a uniform thickness $W_1$, and a second half section where the channel 33 has a width $W_2$ decreasing progressively toward the second press station B. At any of these two sections, the width ($W_1$ or $W_2$) of the channel 33 is slightly smaller than the sum of a total thickness ($H_1+H_2$) of the opposed leg portions 13,14 of the individual coupling element 11 and the thickness ($h_1$ or $h_2$) of the ultrasonic horn tip 35. Such geometry of the first press station A is calculated to ensure that the coupling element leg portions 13,14 be pressed against the ultrasonic horn tip 35 precisely on opposite sides so that their confronting inner surfaces 36,37 can be fused to an extent sufficient to be welded.

In the second press station B, the channel 33 has a substantially uniform width $W_3$ that is slightly smaller than the total thickness ($H_1+H_2$) of the opposed leg portions 13,14 of the individual coupling element 11. This geometry ensures that the coupling element leg portions 13,14 be pressed against each other lightly on the confronting fused surfaces 36,37 to permit proper welding.

The ultrasonic horn 34 functions to ultrasonically vibrate toward and away from the head portions 12 of the coupling elements 11, such direction being parallel to the confronting inner surfaces 13,14 that engage the ultrasonic horn tip 35. This completely obviates the necessity of discontinuing the feed of the coupling element assembly 10 at the softening (first press) station A. Alternatively, the ultrasonic horn 34 may be arranged to apply ultrasonic vibrations in the longitudinal direction of the coupling element assembly 10.

The welding apparatus 31 further includes a pair of radially spaced feed wheels 45,46 which are disposed adjacent the outlet end of the channel 33 for feeding the coupling element assembly 10, each wheel 45,46 having a plurality of peripheral teeth 47 engageable with the coupling elements 11 at the second press station B as the wheels 45,46 rotates on their respective shafts 48,49. The two wheels 45,46 rotate continuously in opposite directions at constant speed with the coupling element assembly 10 moving at constant speed in the direction of the arrow 54.

According to the method of the invention, the coupling element assembly 10 with each coupling element 11 bent into U-shape is continuously fed through the channel 33 at constant speed. The opposed leg portions 13,14 of the successive coupling elements 11 are pressed against the ultrasonic horn tip 35 on opposite sides, as best shown in FIG. 2, so that only the confronting inner surfaces 36,37 of the leg portions 13,14 are softened by ultrasonic vibrations, with the coupling element assembly 10 continuously fed at constant speed. During this period of time, the ultrasonic horn tip 35 vibrated in a direction parallel to the contacting surfaces 36,37 of the coupling elements 11. Upon disengagement of the coupling elements 11 from the ultrasonic horn 34, the opposed leg portions 13,14 of the coupling elements 11 are pressed against each other, and the confronting fused surfaces 36,37 are united together, as best shown in FIG. 3. Thus, the welding of the opposed leg portions 13,14 of the coupling elements 11 has been completed.

FIG. 8 shows fragmentarily a slide fastener stringer 50 which is manufactured with use of the coupling element assembly 10 processed in accordance with the invention, only one coupling element 11 being herein illustrated. The coupling element assembly 10 is attached to a knitted stringer tape 51 along one of its edges by means of at least one connecting thread 52 extending around both elongate warp-knit webs 15,16 at their portions between adjacent coupling elements 11.

Although preferred embodiments have been shown and described, it should be understood that various changes and modifications can be made therein without departing from the scope of the appended claims.

What is claimed is:

1. An apparatus for welding a row of interconnected thermoplastic coupling elements for slide fasteners at opposed leg portions of each coupling element, said apparatus comprising, in combination:

a shaping die member having a channel extending through its length for the passage therethrough of the coupling elements;

means for feeding the coupling elements through said channel at constant speed;

softening means disposed in said channel for softening the opposed leg portions of the coupling elements;

first press means on said shaping die member for pressing the opposed leg portions of the coupling elements against said softening means on opposite sides;

second press means on said shaping die member for pressing the opposed leg portions of the coupling elements against each other, said second press means being located downstream said first press means;

said softening means including an ultrasonic horn having a central portion of a uniform thickness and a pair of first and second wedge-like portions each having a progressively decreasing thickness;

said first press means being defined by a pair of first and second portions of said channel;

said channel having at said first portion a uniform width slightly smaller than the total thickness of the opposite leg portions of one of the coupling elements plus the thickness of said central portion of the ultrasonic horn, and at said second portion a progressively decreasing width slightly smaller than the total thickness of the opposite leg portions of one of the coupling elements plus the thickness of said first wedge-like portion of the ultrasonic horn;

said second press means being defined by a third portion of said channel, said channel having at said third portion a substantially uniform width slightly smaller than the total thickness of the opposed leg portions of one of the coupling elements; and;

said ultrasonic horn being ultrasonically vibratable in a direction parallel to confronting inner surfaces of the coupling element leg portions.

2. An apparatus according to claim 1, said ultrasonic horn being vibratable in a direction perpendicular to the longitudinal axis of the coupling element row.

3. An apparatus according to claim 1, said ultrasonic horn being vibratable in the longitudinal direction of the coupling element row.

4. An apparatus according to claim 1, said feeding means including a pair of radially spaced wheels disposed adjacent said second press means and driven to rotate in opposite directions at constant speed, each of said wheels having a plurality of peripheral teeth engageable with the coupling elements in said channel.

5. An apparatus according to claim 1, said channel further having a mouth flaring toward an inlet end of said channel in order to facilitate the introduction of the coupling element to be welded to said first press means.

* * * * *